United States Patent
Hammarwall et al.

(10) Patent No.: US 9,591,627 B2
(45) Date of Patent: *Mar. 7, 2017

(54) SYSTEM AND METHOD FOR ALLOCATING TRANSMISSION RESOURCES BASED ON A TRANSMISSION RANK

(71) Applicant: TELEFONAKTIEBOLAGET L M ERICSSON (PUBL), Stockholm (SE)

(72) Inventors: David Hammarwall, Vallentuna (SE); George Jöngren, Sundbyberg (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,499

(22) Filed: May 26, 2015

(65) Prior Publication Data
US 2015/0264680 A1 Sep. 17, 2015

Related U.S. Application Data

(63) Continuation of application No. 14/013,710, filed on Aug. 29, 2013, now Pat. No. 9,042,232, which is a (Continued)

(51) Int. Cl.
*H04J 13/00* (2011.01)
*H04W 72/04* (2009.01)
(Continued)

(52) U.S. Cl.
CPC ......... *H04W 72/0413* (2013.01); *H04L 1/003* (2013.01); *H04L 1/0079* (2013.01);
(Continued)

(58) Field of Classification Search
CPC ............... H04W 72/04; H04W 72/042; H04W 72/0413; H04B 7/0413
(Continued)

(56) References Cited

U.S. PATENT DOCUMENTS

| 7,586,834 B2 | 9/2009 | Byun et al. |
| 8,245,092 B2 | 8/2012 | Kotecha et al. |

(Continued)

FOREIGN PATENT DOCUMENTS

| EP | 2015503 A2 | 1/2009 |
| EP | 2086153 A | 8/2009 |

OTHER PUBLICATIONS

3GPP. 3rd Generation Partnership Project; Technical Specification Group Radio Access Network; Evolved Universal Terrestrial Radio Access (E-UTRA); Multiplexing and Channel Coding (Release 9); 3GPP TS 36.212 v9.1.0 (Mar. 2010).

(Continued)

*Primary Examiner* — Ricky Ngo
*Assistant Examiner* — Dewanda Samuel

(57) ABSTRACT

A method for wirelessly transmitting data using a plurality of transmission layers includes estimating a number of data vector symbols to be allocated to one or more user data codewords during the subframe and determining a number of bits in the one or more user data codewords. The method also includes calculating a nominal number of control vector symbols to allocate to control information based, at least in part, on the estimated number of data vector symbols and the determined number of bits in the one or more user data codewords. Additionally, the method includes determining an offset value based, at least in part, on a number of layers over which the wireless terminal will be transmitting during the subframe and calculating a final number of control vector symbols by multiplying the nominal number of control vector symbols and the offset value. The method also includes mapping one or more control codewords to the final number of control vector symbols and transmitting vector symbols carrying the one or more user data codewords and (Continued)

the one or more control codewords over the plurality of transmission layers during the subframe.

15 Claims, 7 Drawing Sheets

Related U.S. Application Data continuation of application No. 13/099,101, filed on May 2, 2011, now Pat. No. 8,526,383.

(60) Provisional application No. 61/330,454, filed on May 3, 2010.

(51) Int. Cl.
*H04L 1/00* (2006.01)
*H04L 5/00* (2006.01)
*H04W 72/02* (2009.01)
*H04L 25/03* (2006.01)
*H04L 1/06* (2006.01)
*H04L 1/16* (2006.01)

(52) U.S. Cl.
CPC .......... *H04L 5/0016* (2013.01); *H04L 5/0026* (2013.01); *H04L 5/0044* (2013.01); *H04L 5/0046* (2013.01); *H04L 5/0053* (2013.01); *H04W 72/02* (2013.01); *H04W 72/0446* (2013.01); *H04L 1/0618* (2013.01); *H04L 1/1664* (2013.01); *H04L 1/1671* (2013.01); *H04L 25/03929* (2013.01)

(58) Field of Classification Search
USPC .................... 370/329, 341, 431, 378–380
See application file for complete search history.

(56) References Cited

U.S. PATENT DOCUMENTS

| | | | |
|---|---|---|---|
| 8,270,518 B2 | 9/2012 | Onggosanusi et al. | |
| 8,325,846 B2 | 12/2012 | Ko et al. | |
| 8,335,466 B2 | 12/2012 | Cai et al. | |
| 8,537,750 B2 | 9/2013 | Jin et al. | |
| 8,537,788 B2 | 9/2013 | Lee et al. | |
| 2003/0103520 A1* | 6/2003 | Chen ................... | H04L 12/5695 370/444 |
| 2006/0195767 A1 | 8/2006 | Ihm | |
| 2007/0005749 A1* | 1/2007 | Sampath .............. | H04B 7/0417 709/223 |
| 2007/0011550 A1 | 1/2007 | Agrawal et al. | |
| 2007/0147253 A1 | 6/2007 | Sutivong | |
| 2007/0286312 A1* | 12/2007 | Kim .................... | H04L 25/0204 375/340 |
| 2008/0132281 A1 | 6/2008 | Kim et al. | |
| 2008/0144733 A1 | 6/2008 | ElGamal et al. | |
| 2008/0186916 A1 | 8/2008 | Oshiba et al. | |
| 2009/0122857 A1 | 5/2009 | Li et al. | |
| 2009/0129502 A1* | 5/2009 | Tong ................... | H04B 7/0417 375/299 |
| 2009/0262695 A1 | 10/2009 | Chen et al. | |
| 2010/0027697 A1* | 2/2010 | Malladi ................ | H04B 7/0417 375/260 |
| 2010/0039928 A1* | 2/2010 | Noh ..................... | H04B 7/0617 370/210 |
| 2010/0195594 A1* | 8/2010 | Seo ..................... | H04B 7/0417 370/329 |
| 2010/0215109 A1* | 8/2010 | Onggosanusi ........ | H04L 1/1893 375/260 |
| 2010/0296603 A1 | 11/2010 | Lee et al. | |
| 2010/0304691 A1 | 12/2010 | Goransson et al. | |
| 2011/0274059 A1* | 11/2011 | Brown ................ | H04L 27/0008 370/329 |

OTHER PUBLICATIONS

LG Electronics. Multiplexing scheme with UCI and data on PUSCH. 3GPP TSG RAN WG1 60bis. R1-102387. Beijing, China. Apr. 12-16, 2010.

Texas Instruments: "Data and Control Multiplexing for UL Multi-Antenna Transmission;" 3GPP Draft R1-102108 TI UCI Multiplex; 3rd Generation Partnership Project; Beijing, China; Apr. 6, 2010.

Samsung: "Discussion on Data and Control Multiplexing in UL MIMO Transmissions;" 3GPP Draft; R1-102212 UL MIMO UCI and PUSCH MUX; 3rd Generation Partnership Project; Beijing, China; Apr. 6, 2010.

Motorola: "On Multiplexing Control and Data in Multi-layer UL-MIMO Transmissions;" 3GPP Draft R1-102149; Multiplex CNTL and Data UL MIMO; 3rd Generation Partnership Project; Beijing, China; Apr. 6, 2010.

Evolved Universal Terrestrial Radio Access, Multiplexing and channel coding (3GPP TS 36.212 version 8.7.0 Release 8); section 5; Jun. 2009.

* cited by examiner

SYSTEM AND METHOD FOR ALLOCATING TRANSMISSION RESOURCES BASED ON A TRANSMISSION RANK

CLAIMING BENEFIT OF PRIOR FILED U.S. APPLICATION

This application is a continuation of U.S. patent application Ser. No. 14/013,710, filed Aug. 29, 2013, which is a continuation of U.S. patent application Ser. No. 13/099,101, filed May 2, 2011, which claims the benefit of U.S. Provisional Application No. 61/330,454 filed May 3, 2010, and the contents of all of the preceding are hereby incorporated by reference herein.

TECHNICAL FIELD OF THE INVENTION

This disclosure relates in general to wireless communication and, more particularly, to resource allocation for multi-antenna transmissions.

BACKGROUND OF THE INVENTION

Multi-antenna transmission techniques can significantly increase the data rates and reliability of wireless communication systems, especially in systems where the transmitter and the receiver are both equipped with multiple antennas to permit the use of multiple-input multiple-output (MIMO) transmission techniques. Advanced communication standards such as Long Term Evolution (LTE) Advanced utilize MIMO transmission techniques that may permit data to be transmitted over multiple different spatially-multiplexed channels simultaneously, thereby significantly increasing data throughput.

While MIMO transmission techniques can significantly increase throughput, such techniques can greatly increase the complexity of managing radio channels. Additionally, many advanced communication technologies, such as LTE, rely on a substantial amount of control signaling to optimize the configuration of transmitting devices and their use of the shared radio channel. Because of the increased amount of control signaling in advanced communication technologies, it is often necessary for user data and control signaling to share transmission resources. For example, in LTE systems, control signaling and user data are, in certain situations, multiplexed by user equipment ("UE") for transmission over a physical uplink shared channel ("PUSCH").

However, conventional solutions for allocating transmission resources are designed for use with single layer transmission schemes in which only a single codeword of user data is transmitted at a time. As a result, such resource allocation solutions fail to provide optimal allocation of transmission resources between control information and user data when MIMO techniques are being utilized to transmit data on multiple layers simultaneously. Additionally, in MIMO systems, sub-optimal precoder selection may result in deteriorated performance for control signaling. This deterioration may be especially significant when low transmission ranks are used. As a result, conventional solutions may be particularly inadequate for multi-layer transmissions with low ranks when a sub-optimal precoder is selected.

SUMMARY OF THE INVENTION

In accordance with the present disclosure, certain disadvantages and problems associated with wireless communication have been substantially reduced or eliminated. In particular, certain devices and techniques for allocating transmission resources between control information and user data are described.

In accordance with one embodiment of the present disclosure, a method for wirelessly transmitting data using a plurality of transmission layers includes estimating a number of data vector symbols to be allocated to one or more user data codewords during the subframe and determining a number of bits in the one or more user data codewords. The method also includes calculating a nominal number of control vector symbols to allocate to control information based, at least in part, on the estimated number of data vector symbols and the determined number of bits in the one or more user data codewords. Additionally, the method includes determining an offset value based, at least in part, on a number of layers over which the wireless terminal will be transmitting during the subframe and calculating a final number of control vector symbols by multiplying the nominal number of control vector symbols and the offset value. The method also includes mapping one or more control codewords to the final number of control vector symbols and transmitting vector symbols carrying the one or more user data codewords and the one or more control codewords over the plurality of transmission layers during the subframe.

In accordance with one embodiment of the present disclosure, a method for receiving user data and control information transmitted wirelessly over a plurality of transmission layers includes receiving a plurality of vector symbols from a wireless terminal over a plurality of transmission layers and estimating a number of user data vector symbols allocated to one or more user data codewords transmitted by the wireless terminal. The method also includes determining a number of bits in the one or more user data codewords and calculating a nominal number of control vector symbols transmitted by the wireless terminal based, at least in part, on the estimated number of user data vector symbols and the determined number of bits in the one or more user data codewords. Additionally the method includes determining an offset value based, at least in part, on a number of transmission layers over which the wireless terminal transmitted the plurality of vector symbols and calculating a final number of control vector symbols by multiplying the nominal number of control vector symbols and the offset value. The method further includes decoding the received vector symbols based on the final number of control vector symbols.

In accordance with another embodiment, a method of scheduling wireless transmissions over a plurality of transmission layers includes receiving a scheduling request from a transmitter and determining a transmission rank, a total number of vector symbols to be used, and a number of bits of user data to be carried by one or more user data codewords, accounting, at least in part, for an estimated number of control vector symbols. The estimated number of control vector symbols are determined by estimating a number of user data vector symbols to be used, estimating a number of bits in one or more control codewords to be transmitted, determining an offset value associated with the transmission rank, and calculating the estimated number of control vector symbols to be used in transmitting the one or more user data codewords. The estimated number of control vector symbols is based, at least in part, on the estimated number of user data vector symbols to be used in transmitting the one or more user data codewords, the estimated number of bits in the one or more control codewords, the number of bits in the one or more user data codewords, and the offset value. The method also includes generating a response to the scheduling request and transmitting the response to the transmitter.

Additional embodiments include apparatuses capable of implementing the above methods and/or variations thereof.

Important technical advantages of certain embodiments of the present invention include reducing the overhead associated with transmitting control signaling by matching the allocation to the quality of the channel indicated by the payloads of the user data codewords. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
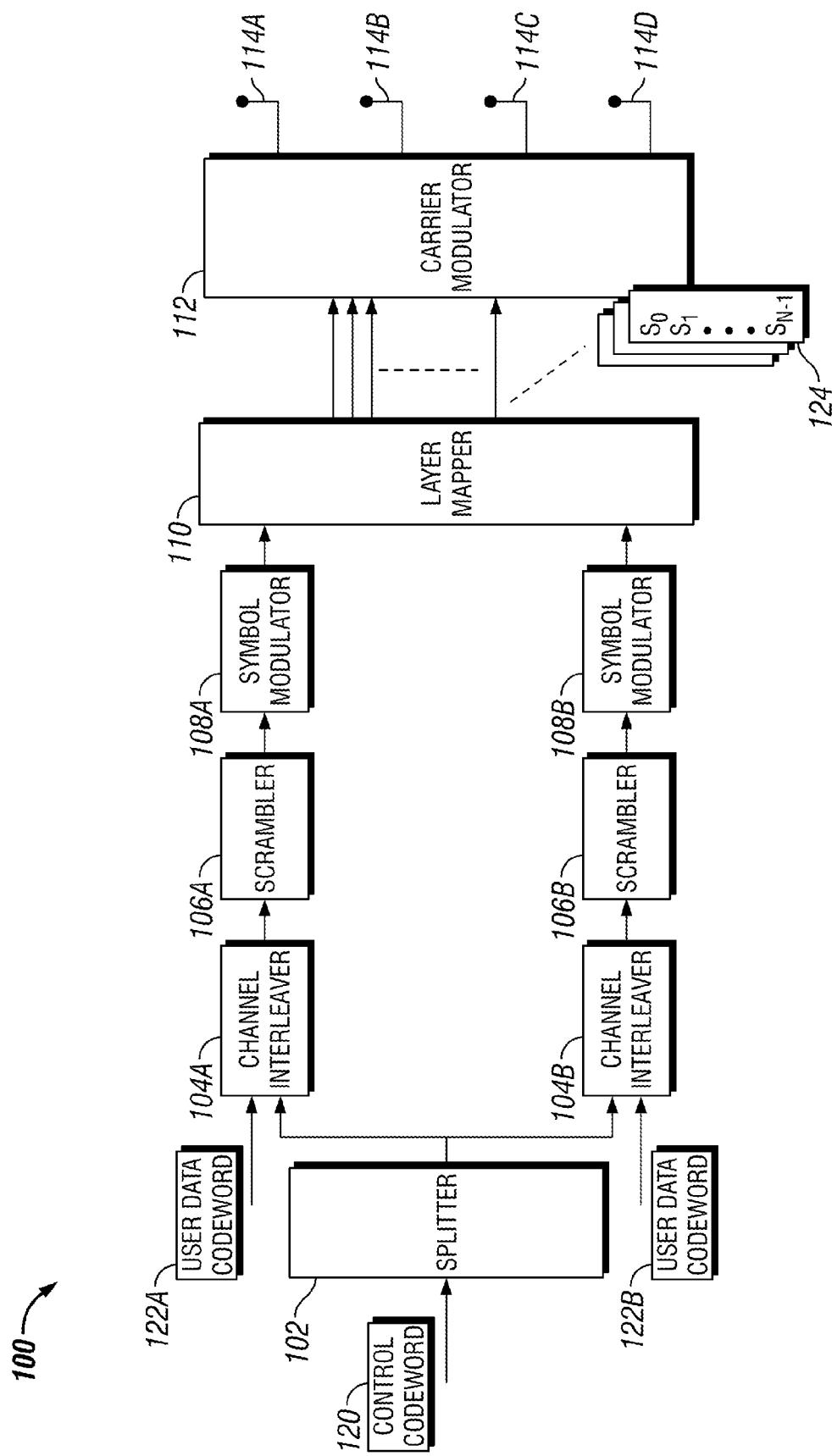
FIG. 1 is a functional block diagram illustrating a particular embodiment of a multi-antenna transmitter.

FIG. 1 is a functional block diagram illustrating a particular embodiment of a multi-antenna transmitter 100. In particular, FIG. 1 shows a transmitter 100 configured to multiplex certain control signaling with user data for transmission over a single radio channel. The illustrated embodiment of transmitter 100 includes a splitter 102, a plurality of channel interleavers 104, a plurality of scramblers 106, a plurality of symbol modulators 108, a layer mapper 110, and a carrier modulator 112. Transmitter 100 allocates transmission resources to control signaling on multiple transmission layers based on an estimate of the quality of the radio channel over which transmitter 100 will transmit. As described further below, particular embodiments of transmitter 100 reduce the overhead for transmitted control information by using an estimate of the data payloads of multiple layers and/or codewords as a measure of the channel quality.

Control signaling can have a critical impact on the performance of wireless communication systems. As used herein, "control signaling" and "control information" refers to any information communicated between components for purposes of establishing communication, any parameters to be used by one or both of the components in communicating with one another (e.g., parameters relating to modulation, encoding schemes, antenna configurations), any information indicating receipt or non-receipt of transmissions, and/or any other form of control information. For example, in LTE systems, control signaling in the uplink direction includes, for example, Hybrid Automatic Repeat reQuest (HARQ) Acknowledgments/Negative Acknowledgements (ACK/NAKs), precoder matrix indicators (PMIs), rank indicators (RIs), and channel quality indicators (CQIs), which are all used by the eNodeB to get confirmation of successful reception of transport blocks or to improve the performance of downlink transmissions. Although control signaling is often transmitted on separate control channels, such as the physical uplink control channel (PUCCH) in LTE, it may be beneficial or necessary to transmit control signaling on the same channel as other data.

For example, in LTE systems, when a periodic PUCCH allocation coincides with a scheduling grant for a user equipment (UE) to transmit user data, the user data and control signaling share transmission resources to preserve the single-carrier property of the discrete Fourier transform, spread orthogonal frequency-division multiplexing (DFTS-OFDM) transmission techniques used by LTE UEs. Furthermore, when a UE receives a scheduling grant to transmit data on the physical uplink shared channel (PUSCH), it typically receives information from the eNodeB related to the characteristics of the uplink radio propagation channel and other parameters that can be used to improve the efficiency of PUSCH transmissions. Such information may include modulation and coding scheme (MCS) indicators as well as, for UEs capable of using multiple transmission antennas, PMIs or RIs. As a result, UEs may be able to use this information to optimize PUSCH transmissions for the radio channel, thereby increasing the amount of data that can be transmitted for a given set of transmission resources. Thus, by multiplexing control signaling with the user data transmitted on PUSCH, a UE can support significantly larger control payloads than when transmitting control signaling by itself on PUCCH.

It may be possible to multiplex control signaling and user data by simply dedicating a set amount of the time-domain transmission resources to control information and then perform carrier modulation and precoding of the control signaling along with the data. In this way control and data are multiplexed and transmitted in parallel on all sub-carriers. For example, in LTE Release 8, DFTS-OFDM symbols are formed from a predetermined number of information vector symbols. As used herein, a "vector symbol" may represent any collection of information that includes an information element associated with each transmission layer over which the information is to be transmitted. Assuming a normal cyclic prefix length, fourteen of these DFTS-OFDM symbols can be transmitted in each uplink subframe. A predetermined number and distribution of these symbols are used to transmit various types of control signaling and the remaining symbols may be used to transmit user data.

However, the amount of control signaling to be multiplexed on a data transmission is typically much fewer than the amount of user data. Moreover, since control signaling and user data may each be associated with different block error-rate requirements, control signaling is often encoded separately and using a different encoding scheme from user data. For example, user data is often encoded with turbo codes or low-density parity-check (LDPC) codes that are highly efficient for longer block lengths (i.e., larger blocks of information bits). Control signaling that uses only a small amount of information bits, such as HARQ ACK/NAK signaling or rank indicators, is often most efficiently encoded using a block code. For medium-sized control signaling, such as larger size CQI reports, a convolutional code (possibly tail biting) often provides the best performance. Consequently, fixed or predetermined allocations of transmission resources to control signaling and user data can lead to inefficient use of such resources as the optimal resource allocation will often depend on numerous factors, including the channel quality, the type of control signaling, and various other considerations.

The use of multiple transmit antennas can further complicate the allocation of transmission resources between control signaling and user data when the two types of information are multiplexed together on a common channel. When MIMO techniques are used to simultaneously transmit multiple data codewords in parallel, control signaling may be transmitted on multiple different codewords and/or layers of the transmission scheme. The optimal allocation of resources in such situations may differ from the optimal allocation under the same circumstances when a single transmission antenna is used. Moreover, the multiple-antenna technique used for control signaling may be different from that used for user data. Control signaling is often encoded for maximum robustness (e.g., with maximum transmission diversity) rather than for maximum throughput. By contrast, user data is often combined with a retransmission mechanism that allows for more throughput-aggressive multiple-antenna encoding techniques. Thus, if transmitter 100 has information indicating the supported payload of user data, transmitter 100 may not be able to assume the supported payload for control signaling is the same when determining the optimal allocation of transmission resources for control signaling. For example, the supported peak spectral efficiency of the encoded user data may be significantly larger than the supported peak spectral efficiency of the encoded control signaling.

Thus, particular embodiments of transmitter 100 determine an allocation of transmission resources across multiple codewords and/or transmission layers for control signaling on a channel in which control signaling and user data are multiplexed. More specifically, particular embodiments of transmitter 100 use the data payloads of the multiple layers or codewords to estimate the spectral efficiency supported by the multi-layer encoding scheme currently being used by transmitter 100 for control signaling. Based on this estimated spectral efficiency, transmitter 100 may then determine the amount of transmission resources (e.g., the number of vector symbols) to use for control signaling.

Turning to the example embodiment illustrated by FIG. 1, transmitter 100, in operation, generates or receives control codewords and data codewords (represented, in FIG. 1, by control codeword 120 and user data codewords 122a and 122b, respectively) for transmission to a receiver over a radio channel. To permit multiplexing of control codewords 120 and user data codewords 122 over a common channel, splitter 102 splits control codeword 120 for use by multiple channel interleavers 104. Splitter 102 may split control codeword 120 in any appropriate manner between channel interleavers 104, outputting a complete copy or some suitable portion on each datapath. As one example, splitter 102 may split control codeword 120 for use in the multiple datapaths by replicating control codeword 120 on both datapaths, outputting a complete copy of control codeword 120 to each channel interleaver 104. As another example, splitter 102 may split control codeword 120 by performing serial-to-parallel conversion of control codeword 120, outputting a unique portion of control codeword 120 to each channel interleaver 104.

Channel interleavers 104 each interleave a user data codeword 122 with control codeword 120 (either a complete copy of control codeword 120, a particular portion of control codeword 120, or a combination of both, depending on the configuration of splitter 102). Channel interleavers 104 may be configured to interleave user data codewords 122 and control codeword 120 so that layer mapper 110 will map them to vector symbols in a desired manner. The interleaved outputs of channel interleavers 104 are then scrambled by scramblers 106 and modulated by symbol modulators 108.

Figure 2A:
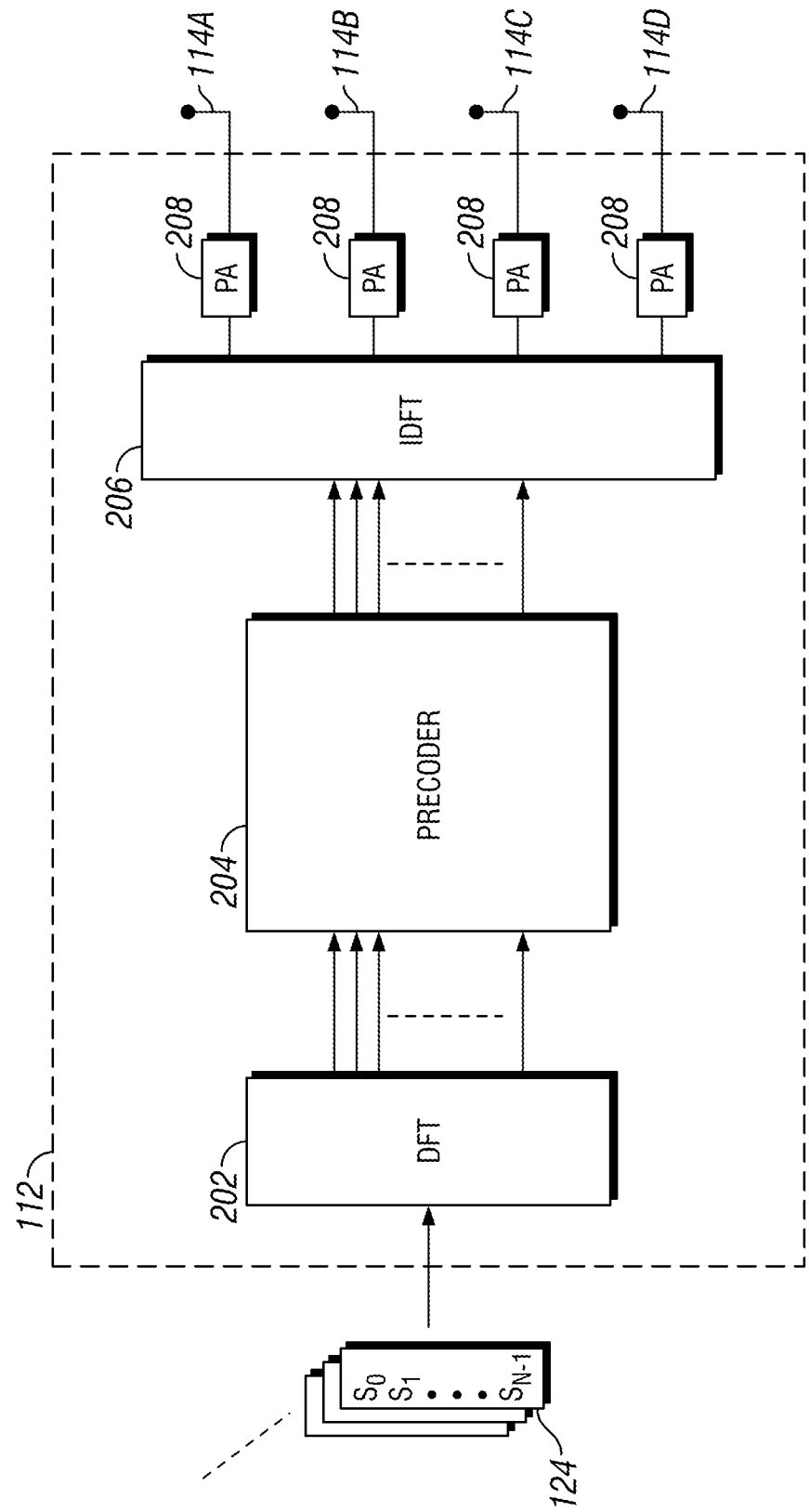
FIG. 2A is a functional block diagram illustrating a particular embodiment of a carrier modulator that may be used in the transmitter of FIG. 1.
Figure 2B:
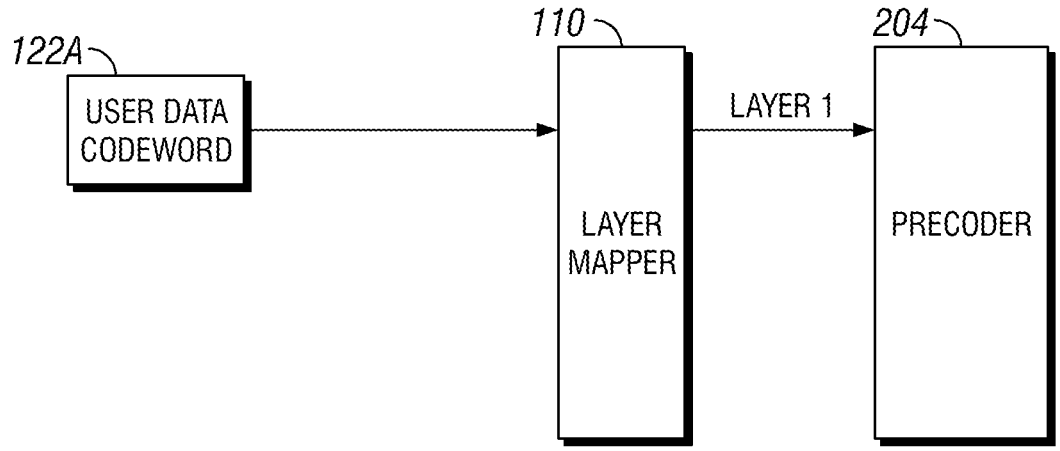
FIGS. 2B-2E show example transmissions made by a particular embodiment of the transmitter.
Figure 2C:
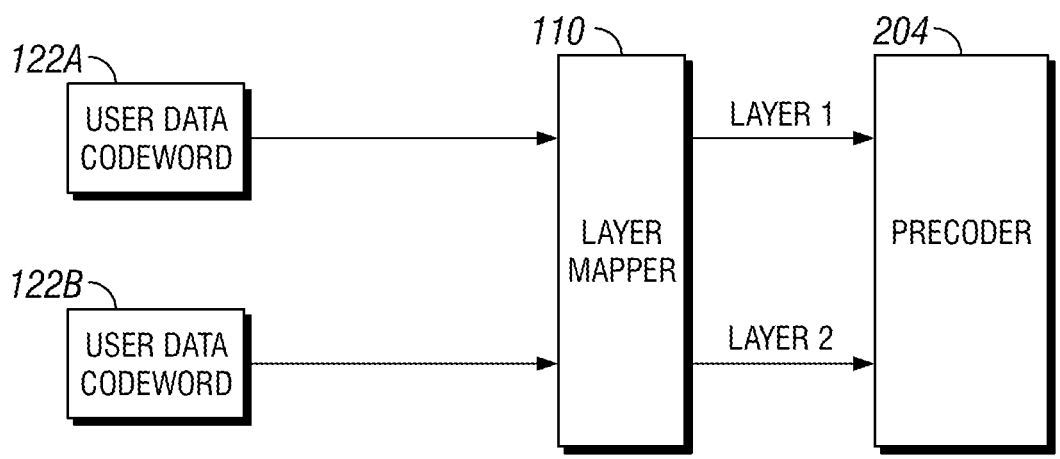
Figure 2D:
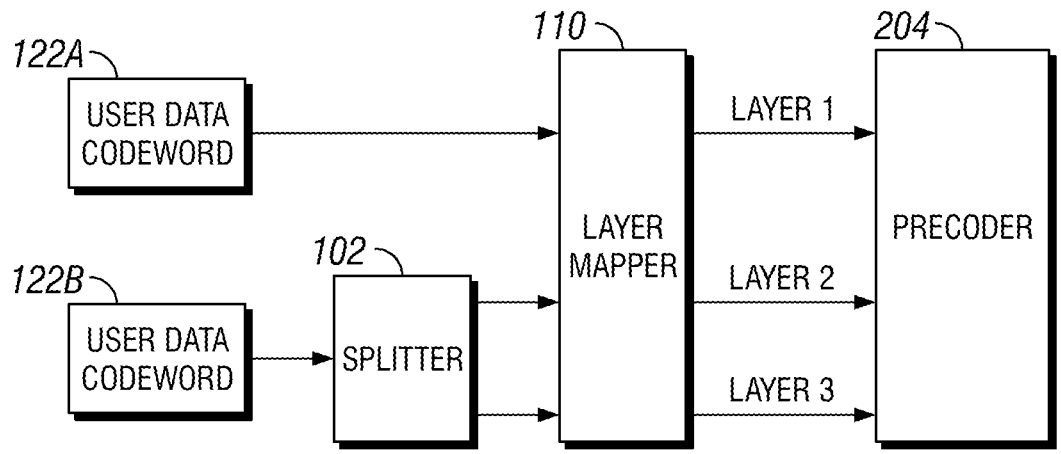
Figure 2E:
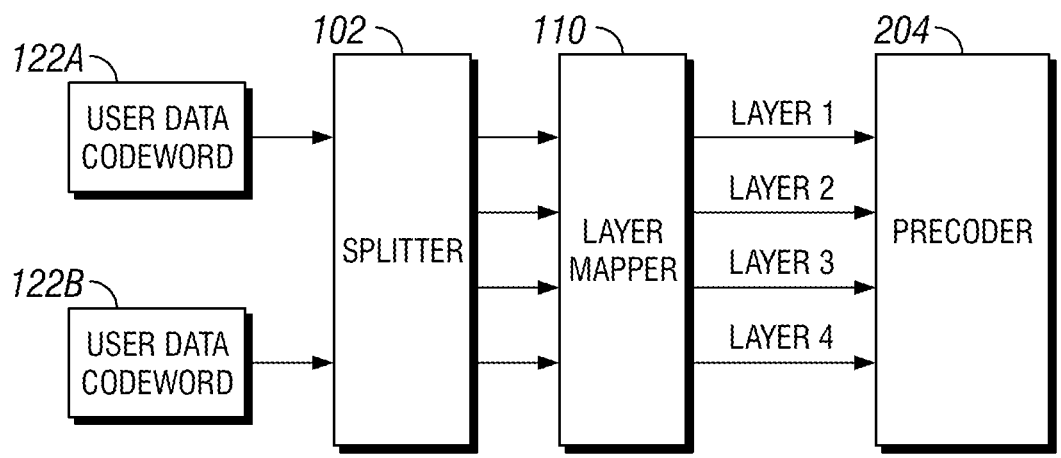

The symbols output by symbol modulators 108 are mapped to transmission layers by layer mapper 110. In particular embodiments, there is a relationship between the number of codewords of user data and/or control information being transmitted and the number of transmission layers (the "transmission rank") to be used for the transmission. For example, in certain embodiments where transmitter 100 represents an LTE UE, a single transmission layer is used when a single user data codeword 122 is to be transmitted, as shown by FIG. 2B, and the transmission has a rank of 1. However, when two user data codewords 122 are transmitted in such embodiments, the number of layers used may vary depending on the circumstances and capabilities of the devices involved, as shown by FIGS. 2C-2E. FIG. 2C illustrates a situation in which a first user data codeword 120a and a second user data codeword 120b to be transmitted are each mapped to a single layer, resulting in two layers being used for the transmission. FIG. 2D illustrates a situation in which user data codeword 120a is mapped to a single layer, but user data codeword 120b is mapped to two layers with all or a portion of user data codeword 120b being transmitted on each of the two transmission layers. As a result, the transmission shown in FIG. 2D uses three layers. FIG. 2E illustrates a situation in which both user data codeword 120a and user data codeword 120b are mapped to two transmission layers. As a result, the transmission shown in FIG. 2E utilizes four transmission layers. A copy (or a different portion) of user data codeword 120a is transmitted on each of the first and second layers, and a copy (or a different portion) of user data codeword 120b is transmitted on each of the third and the fourth layers.

Layer mapper 110 outputs a series of vector symbols 124 that are provided to carrier modulator 112. As an example, for embodiments of transmitter 100 that support LTE, each vector symbol 124 may represent an associated group of modulation symbols that are to be transmitted simultaneously on different transmission layers. Each modulation symbol in a particular vector symbol 124 is associated with a specific layer over which that modulation symbol will be transmitted.

After layer mapper 110 maps the received symbols into vector symbols 124, carrier modulator 112 modulates information from the resulting vector symbols 124 onto a plurality of radiofrequency (RF) subcarrier signals. Depending on the communication technologies supported by transmitter 100, carrier modulator 112 may also process the vector symbols 124 to prepare them for transmission, such as by precoding vector symbols 124. The operation of an example embodiment of carrier modulator 112 for LTE implementations is described in greater detail below with respect to FIG. 2. After any appropriate processing, carrier modulator 112 then transmits the modulated subcarriers over a plurality of transmission antennas 114.

When multiplexing control and data on a precoded multi-antenna system the multiplexed control signals experience an effective channel given by Equation (1) (after residual Inter-Symbol Interference is accounted for):

$$\hat{s}(n)=H_{eff,W} \otimes s(n)+e(n) \qquad \text{Equation (1)}$$

where the received signal, ŝ(n), represents the precoded time-domain signal, s(n), that is transmitted by transmitter 100 circularly convolved with an effective channel impulse response, $H_{eff,W}$, and acted on by a noise/interference vector, e(n). In Equation (1), the subscript W in $H_{eff,W}$ indicates that the effective channel depends on the precoder, W.

The transmission rank, and thus the number of spatially multiplexed layers, is reflected by the number of columns in precoder, W. For efficient performance, a transmission rank that matches the channel properties is typically selected. Often, the device selecting the precoder is also responsible for selecting the transmission rank—one way is to simply evaluate a performance metric for each possible rank and pick the rank which optimizes the performance metric. For the LTE-Advanced uplink, the use of closed-loop precoding results in the eNodeB selecting the precoder(s) and transmission rank and thereafter signaling the selected precoder that transmitter 100 is supposed to use.

Since the effective channel seen by the control signaling, $H_{eff,W}$, depends to a large extent on the selected precoder, the control signaling is sensitive to the performance of the precoder. The precoder is typically optimized to maximize the throughput of the data, which generally has looser requirements on the block error rate (BLER) than the control signaling. Contrary to the data channel, control signaling typically has no retransmission mechanism, and therefore has significantly tighter requirements on the robustness of the link. If a control signaling transmission is unsuccessful, system operation is often jeopardized.

One particular problem for precoded multiple-antenna transmissions occurs when the precoder, W, is selected such that it is not well matched to the radio propagation channel, $H_k$, in which case the signal-to-interference-plus-noise ratio (SINR) on one or more streams will be significantly decreased. This may for example happen because of estimation noise that results in a suboptimal precoder being selected. A bursty inter-cell interference may likewise result in the wrong transmission rank being selected. The impact of erroneous precoder selection is particularly severe for low-rank channels, where the spatial transmit directions that convey essentially no energy to the receiver (or the "null space") are large and a corresponding low-rank precoder that has a significant overlap with the large null-space may be erroneously selected. This is less of a problem, however, for high rank channels, which have a small null-space. Such high-rank channels will most likely be matched with high-rank precoders. Therefore, it is much less likely that an erroneously selected high-rank precoder will be fully confined to the small null-space of the high-rank channels with which it will be used.

As a result of this discrepancy between high-rank and low-rank transmissions, particular embodiments of transmitter 100 may consider the rank of a transmission when allocating transmission resources between the control signaling and user data that will be transmitted. In particular embodiments, this allocation of transmission resources is reflected in the number of vector symbols 124 transmitter 100 uses to transmit a particular control codeword 120. Thus, transmitter 100 may consider the transmission rank of the transmission in determining the number of vector symbols 124 to use in transmitting user data codewords 122 and/or the number to use in transmitting control codewords 120.

Transmitter 100 may use the transmission rank in any suitable manner to determine the appropriate number of vector symbols 124 to allocate to the different types of information. As one specific example, particular embodiments of transmitter 100 may calculate a nominal number (Q̂') of vector symbols 124 to allocate to control codewords 120 and adjust this nominal number using a rank-specific offset value ($\beta_{offset}(r)$) associated with the transmission rank of the relevant transmission to determine a scaled number (Q') of vector symbols 124 to allocate to control codewords 120.

The offset value may represent any suitable value that may be used to adjust the amount of transmission resources used to transmit control information. As one example, in particular embodiments, lower-rank transmissions are associated with larger offset values than higher-rank transmissions. As a result, in such embodiments, the offset values for a lower-rank transmission may increase the nominal allocation of resources by more than the offset value of a higher-rank transmission. This results in more transmission resources being allocated to control information for lower-ranked transmissions and, for such transmissions, can increase their robustness to mismatched precoders.

The possible transmission ranks (i.e., the number of transmission layers used for a transmission) for a transmission are each associated with an offset value. Depending on the configuration of the specific embodiment of transmitter 100, each possible transmission rank may be associated with a different offset value or multiple transmission ranks may be associated with the same offset value. For example, in particular embodiments, the transmission rank for a transmission will depend in part on the number of user data codewords 122 to be transmitted, as explained above with respect to FIGS. 2B-2E. As a result, the various possible transmission ranks that transmitter 100 could use to transmit a given number of user data codewords 122 may all be associated with the same offset value. In such embodiments, transmitter 100 may use an offset value of a first size for transmission ranks associated with the transmission of one user data codeword 122 (e.g., for a rank one transmission such as the one shown in FIG. 2B) and an offset value of a second size for all transmission ranks associated with the transmission of two data codewords 122 (e.g., for a rank two, a rank three, or a rank four transmission such as the ones shown in FIGS. 2C-2E, respectively). As a result, transmitter 100 may use a larger offset value to allocate control signaling for transmissions involving a single user data codeword 122 than for transmissions involving multiple user data codewords 122, because a transmission involving a single user data codeword 122 uses less transmission layers than a transmission involving multiple user data codewords 122.

Transmitter 100 may use the relevant offset value to determine a resource allocation in any suitable manner. In particular embodiments, transmitter 100 may determine Q' such that:

$$Q' = \hat{Q}' \cdot \beta_{offset}(r)$$

This nominal number Q̂' may be a dynamically changing nominal resource allocation that is determined from the payloads of the user data codewords 122 and the number of bits in control codewords 120. In particular embodiments, transmitter 100 may calculate Q̂' such that:

$$\hat{Q}' = O \cdot f\left(\hat{Q}_{data}, \sum_{r=0}^{C_n-1} K_{0,r}, \ldots, \sum_{r=0}^{C_n-1} K_{N_{CW}-1,r}\right) \quad \text{Equation (2)}$$

and thus:

$$Q' = O \cdot f\left(\hat{Q}_{data}, \sum_{r=0}^{C_n-1} K_{0,r}, \ldots, \sum_{r=0}^{C_n-1} K_{N_{CW}-1,r}\right) \cdot \beta_{offset}(r) \quad \text{Equation (3)}$$

where $$f\left(\hat{Q}_{data}, \sum_{r=0}^{C_n-1} K_{0,r}, \ldots, \sum_{r=0}^{C_n-1} K_{N_{CW}-1,r}\right)$$

represents a function that, given an estimate of the number of vector symbols 124 that will be allocated to transmitting user data codewords 122 ($\hat{Q}_{data}$) (such vector symbols referred to herein as "user data vector symbols") maps the data payloads $$\left(\sum_{r=0}^{C_n-1} K_{n,r}\right)$$

of each of the $N_{CW}$ user data codewords 122 into an estimate of the number of vector symbols 124 to be used for each bit of the control codewords 120 to be transmitted during the subframe. In Equations (2) and (3), $K_{q,r}$ represents the number of bits in an r-th code block of a q-th codeword of user data to be transmitted during the subframe with r≥1 and q≥1, $C_{n,m}$ is a number of code blocks in an m-th codeword of user data with m≥1, $N_{CW}$ is a number of control codewords to be transmitted during the subframe, O is a number of bits in control codewords 120. If cyclic redundancy check (CRC) bits are used with control codewords 120 and/or user data codewords 122, the relevant values for $K_{q,r}$ and/or O may include any CRC bits in their totals. As suggested by the designated ranges of r (r≥1) and q (q≥1) for the above formula, transmitter 100 may perform this calculation using one or more code blocks from one or more user data codewords 122.

In particular embodiments that use such a formulation to determine the nominal number of control vector symbols, transmitter 100 may estimate the number of user data vector symbols ($\hat{Q}_{data}$) without accounting for the resulting number of vector symbols 124 that will be allocated to control information. Instead, transmitter 100 may estimate $\hat{Q}_{data}$ based on the assumption that all transmission resources granted to transmitter 100 for the relevant transmission will be used to transmit user data. For example, transmitter 100 may use a value of $\hat{Q}_{data} = M_{sc}^{PUSCH-initial} \cdot N_{symb}^{PUSCH-initial}$, where $M_{sc}^{PUSCH-initial}$ is the total number of subcarriers scheduled for use by transmitter 100 for the relevant transmission, and $N_{symb}^{PUSCH-initial}$ is the total number of vector symbols 124 granted to transmitter 100 for transmitting both control and user data in the relevant transmission. In such embodiments, transmitter 100 overestimates the amount of resources that will be used for transmitting control codewords 120 as a tradeoff for simplifying the allocation determination.

In other embodiments that use such a formulation to determine the nominal number, transmitter 100 may account for the number of control vector symbols that would result from the estimated the number of user data vector symbols $\hat{Q}_{data}$ when estimating $\hat{Q}_{data}$. For example, transmitter 100 may use a specific form of Equation (2) according to which:

$$\hat{Q}' = O \cdot f\left(\hat{Q}_{data}(Q'), \sum_{r=0}^{C_{n,0}-1} K_{0,r}, \ldots, \sum_{r=0}^{C_{n,N_{CW}}-1} K_{N_{CW}-1,r}\right) \quad \text{Equation (4)}$$

and thus:

$$\hat{Q}' = O \cdot f\left(\hat{Q}_{data}(Q'), \sum_{r=0}^{C_{n,0}-1} K_{0,r}, \right.$$

$$\left. \ldots, \sum_{r=0}^{C_{n,N_{CW}}-1} K_{N_{CW}-1,r}\right) \cdot \beta_{offset}(r) \quad \text{Equation (5)}$$

where the estimated number of user data vector symbols to be used $\hat{Q}_{data}(Q')$ is a function of the scaled number Q' of vector symbols 124 to be allocated to control information. Transmitter 100 may then solve for Q' recursively or by substituting an expression for $\hat{Q}_{data}(Q')$ and solving for Q' directly. Embodiments of transmitter 100 that utilize Equations (4) and (5) to allocate transmission resources between user data and control information may reduce the overhead associated with transmitting control information by basing the allocation on a more accurate estimate of $\hat{Q}_{data}$.

As another example of how transmitter 100 may account for the transmission rank of a transmission in allocating transmission resources, particular embodiments of transmitter 100 may determine the nominal number of control vector symbols based on the configurable offset parameter that will be used to scale the nominal number of control vector symbols. Thus, in particular embodiments, transmitter 100 may calculate $\hat{Q}'$ such that:

$$Q' = \hat{Q}'(\beta_{offset}(r)) \cdot \beta_{offset}(r) \quad \text{Equation (6)}$$

Such embodiments may use a formulation for $\hat{Q}'(\beta_{offset}(r))$ according to which:

$$\hat{Q}'(\beta_{offset}(r)) = \frac{O \cdot Q_{all}}{g\left(\sum_{r=0}^{C_{n,0}-1} K_{0,r}, \ldots, \sum_{r=0}^{C_{n,N_{CW}}-1} K_{N_{CW}-1,r}\right) + O\beta_{offset}(r)} \quad \text{Equation (7)}$$

and thus:

$$Q' = \frac{O \cdot Q_{all}}{g\left(\sum_{r=0}^{C_{n,0}-1} K_{0,r}, \ldots, \sum_{r=0}^{C_{n,N_{CW}}-1} K_{N_{CW}-1,r}\right) + O\beta_{offset}(r)} \cdot \beta_{offset}(r) \quad \text{Equation (8)}$$

In Equations (7) and (8), $Q_{all}$ represents the total resource allocation granted to transmitter 100 (or an estimate thereof) for transmitting both control information and user data in the relevant transmission. In particular embodiments, transmitter may use a value of $Q_{all}$ equal to $M_{sc}^{PUSCH\text{-}initial} \cdot N_{symb}^{PUSCH\text{-}initial}$. By accounting for the effect of the rank-specific offset parameter in determining the nominal number, transmitter 100 may be able to optimize the amount of overhead used to transmit control information.

As yet another example of how transmitter 100 may account for transmission rank in allocating transmission resources, particular embodiments of transmitter 100 may use a different configurable offset parameter in determining the nominal number of control vector symbols. That is, transmitter 100 may use a first rank-specific offset parameter, $\beta_{offset}(r)$, to scale a nominal number of control vector symbols that transmitter 100 determines using a second rank-specific offset parameter, $\tilde{\beta}_{offset}(r)$, such that $$Q' = \hat{Q}'(\tilde{\beta}_{offset}(r)) \cdot \beta_{offset}(r). \quad \text{Equation (9)}$$

The use of different offset parameters may permit transmitter 100 to have greater control in optimizing the allocation of transmission resources.

After calculating the scaled number of control vector symbols 124 to allocate using any of the techniques described above, transmitter 100 may process the scaled value as appropriate to ensure a certain type of final value or a final value in a particular range. Transmitter 100 may then use the scaled number, or the result of any such processing, to determine a number of vector symbols 124 to allocate to control information. For example, transmitter 100 may convert Q' to an integer-valued result (e.g., using a ceiling function) or may set a minimum and/or maximum for Q' to ensure that the number of allocated control vector symbols 124 is within a particular range. Alternatively, transmitter 100 may process any of the individual inputs used by the above algorithms (e.g., the estimated inverse spectral efficiency of user data) as appropriate to ensure a suitable type or range for the resulting output. As one specific example, transmitter 100 may utilize a minimum threshold for the inverse spectral efficiency of user data to ensure that the resulting number of vector symbols 124 allocated to each bit of control signaling is greater than a minimum amount.

After determining the number of vector symbols to allocate to control signaling for the relevant transmission, transmitter 100 may then map the control codewords 120 onto the final number of symbol vectors 124. Transmitter 100 also maps the user data codewords 122 onto the determined number of user data symbols vectors. Transmitter 100 may then transmit the relevant user data and control symbol vectors, as described above.

Thus, transmitter 100 may provide improved resource allocation techniques in a variety of different forms. Using these resource allocation techniques, certain embodiments of transmitter 100 may be able to match the allocation of control-signaling transmission resources to the rank of the transmission As a result, such embodiments may be able to provide a more precise allocation of control size, resulting in lower uplink overhead and/or improved robustness at the same overhead. In particular, these embodiments may provide significantly improved performance for low-rank transmissions when a sub-optimal precoder is selected. Consequently, certain embodiments of transmitter 100 may provide multiple operational benefits. Specific embodiments, however, may provide some, none, or all of these benefits.

Figure 5:
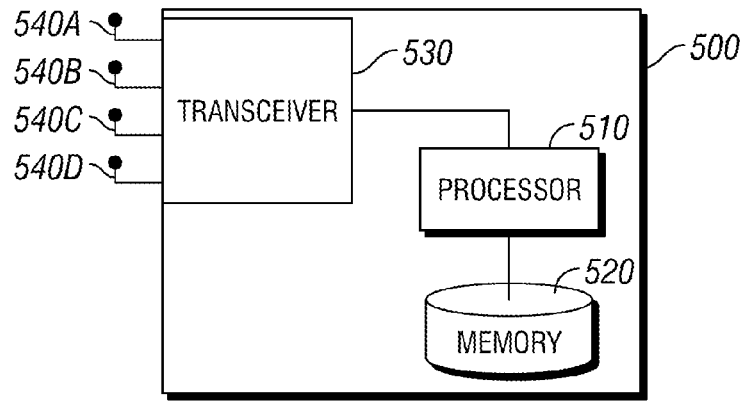
FIG. 5 is a structural block diagram showing the contents of a network node that is responsible for receiving and/or scheduling transmissions of the transmitter.
Figure 6:
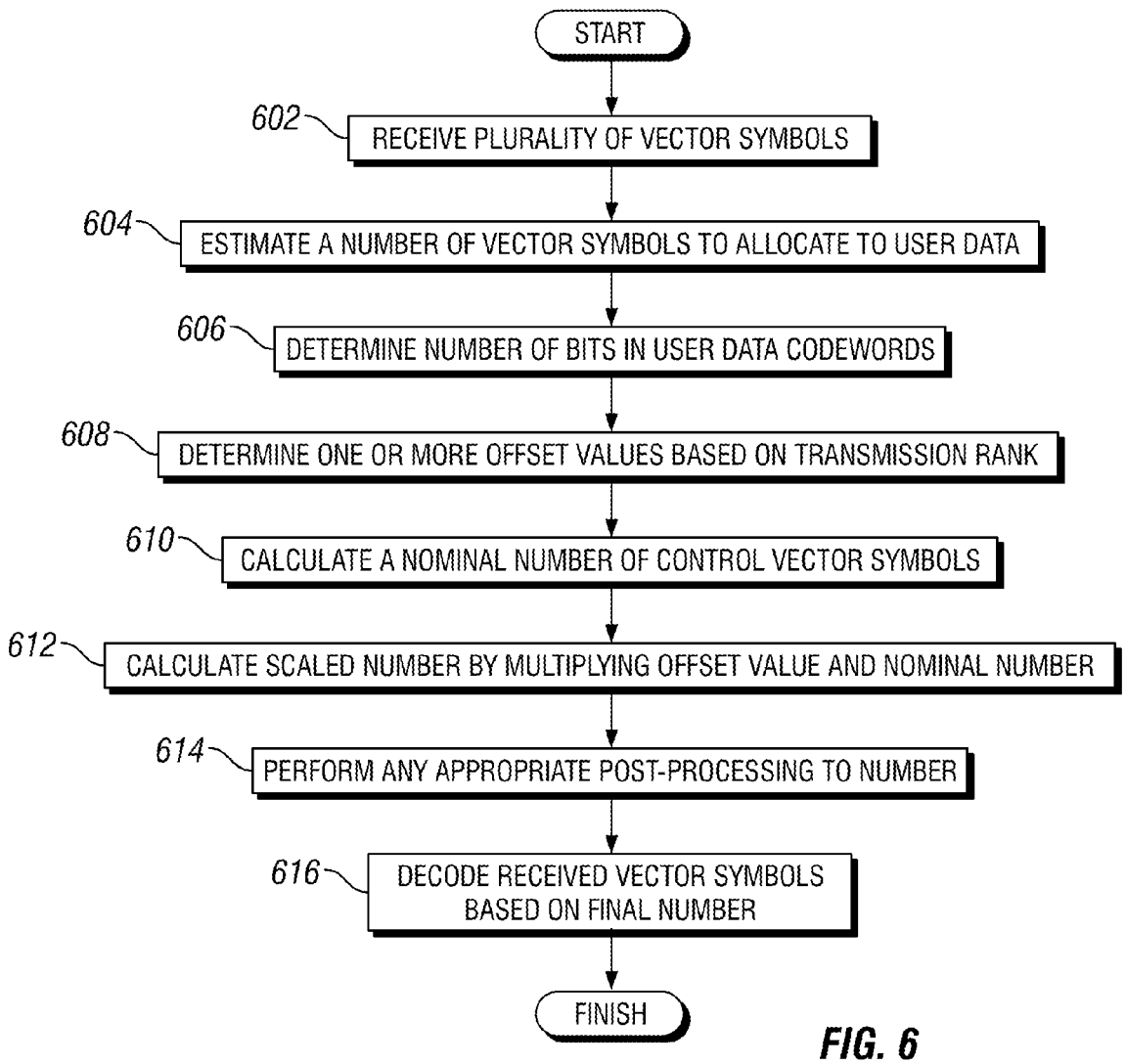
FIG. 6 is a flowchart showing example operation of a particular embodiment of the network node of FIG. 5 in receiving transmissions from the transmitter.
Figure 7:
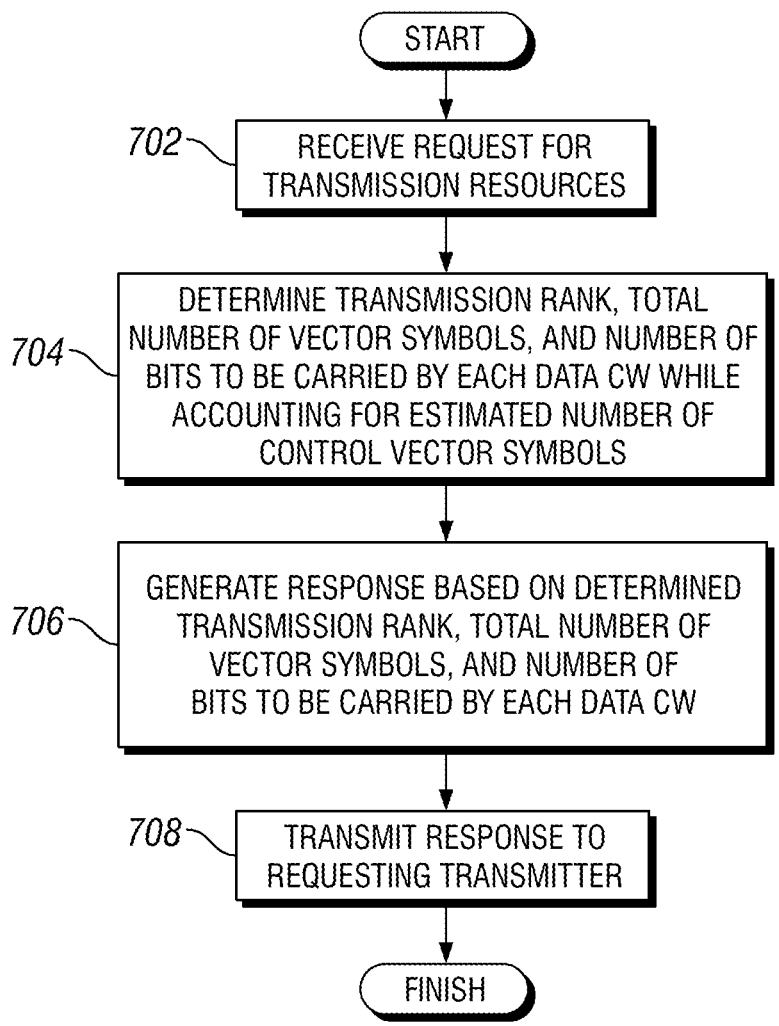
FIG. 7 is a flowchart showing example operation of a particular embodiment of the network node in scheduling transmissions of the transmitter.

Although the description above focuses on implementation of the described resource allocation techniques in a transmitter, the above concepts can also be applied at a receiver. For example, when decoding transmissions received from transmitter 100, a receiver may utilize certain aspects of the described techniques to estimate the amount of transmission resources that have been allocated to control signaling. Furthermore, the described concepts may be applied for purposed of scheduling use of transmission resources in wireless communication systems that utilize centralized resource management. For example, an eNode B may utilize certain aspects of the described techniques to estimate the amount of transmission resources a UE that incorporates transmitter 100 will allocate to control signaling for a given period of time or for a given amount of transmitted data. Based on this estimate, the eNode B may determine an appropriate number of transmission resources to schedule for use by the relevant UE. FIGS. 5-7 describe in greater detail the contents and operation of example devices capable of performing such receiving and/or scheduling. Additionally, although the description herein focuses on implementation of the described resource allocation techniques in wireless communication networks supporting LTE, the described resource allocation techniques may be utilized in conjunction with any appropriate communication technologies including, but not limited to LTE, High-Speed Packet Access plus (HSPA+), and Worldwide Interoperability for Microwave Access (WiMAX).

FIG. 2 is a functional block diagram showing in greater detail the operation of a particular embodiment of carrier modulator 112. In particular, FIG. 2 illustrates an embodiment of carrier modulator 112 that might be used by an embodiment of transmitter 100 that utilizes DFTS-OFDM as required for uplink transmissions in LTE. Alternative embodiments may be configured to support any other appropriate type of carrier modulation. The illustrated embodiment of carrier modulator 112 includes a DFT 202, a precoder 204, an inverse DFT (IDFT) 206, and a plurality of power amplifiers (PAs) 208.

Carrier modulator 112 receives vector symbols 124 output by layer mapper 110. As received by carrier modulator 112, vector symbols 124 represent time domain quantities. DFT 202 maps vector symbols 124 to the frequency domain. The frequency-domain version of vector symbols 124 are then linearly precoded by precoder 204 using a precoding matrix, W, that is ($N_T \times r$) in size, where $N_T$ represents the number of transmission antennas 114 to be used by transmitter 100 and r represents the number of transmission layers that will be used by transmitter 100. This precoder matrix combines and maps the r information streams onto $N_T$ precoded streams. Precoder 204 then generates a set of frequency-domain transmission vectors by mapping these precoded frequency-domain symbols onto a set of sub-carriers that have been allocated to the transmission.

The frequency-domain transmission vectors are then converted back to the time domain by IDFT 206. In particular embodiments, IDFT 206 also applies a cyclic prefix (CP) to the resulting time-domain transmission vectors. The time-domain transmission vectors are then amplified by power amplifiers 208 and output from carrier modulator 112 to antennas 114, which are used by transmitter 100 to transmit the time-domain transmission vectors over a radio channel to a receiver.

Figure 3:
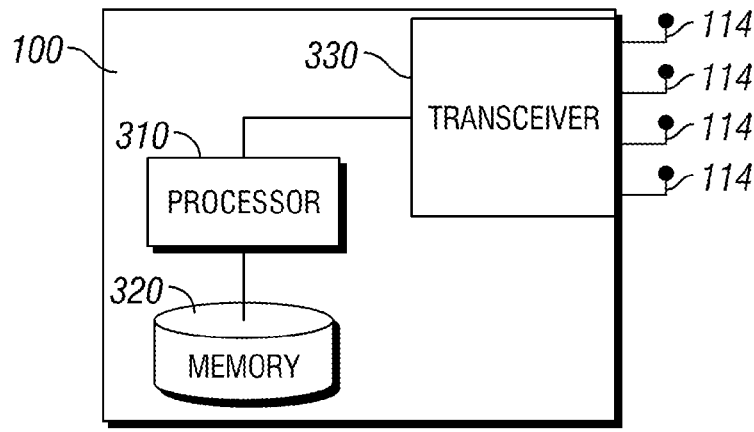
FIG. 3 is a structural block diagram showing the contents of a particular embodiment of the transmitter.

FIG. 3 is a structural block diagram showing in greater detail the contents of a particular embodiment of transmitter 100. Transmitter 100 may represent any suitable device capable of implementing the described resource allocation techniques in wireless communication. For example, in particular embodiments, transmitter 100 represents a wireless terminal, such as an LTE user equipment (UE). As shown in FIG. 3, the illustrated embodiment of transmitter 100 includes a processor 310, a memory 320, a transceiver 330, and a plurality of antennas 114.

Processor 310 may represent or include any form of processing component, including dedicated microprocessors, general-purpose computers, or other devices capable of processing electronic information. Examples of processor 310 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of transmitter 100 that includes a single processor 310, transmitter 100 may include any number of processors 310 configured to interoperate in any appropriate manner. In particular embodiments, some or all of the functionality described above with respect to FIGS. 1 and 2 may be implemented by processor 310 executing instructions and/or operating in accordance with its hardwired logic.

Memory 320 stores processor instructions, equation parameters, resource allocations, and/or any other data utilized by transmitter 320 during operation. Memory 320 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 320 may include one or more physical components local to or remote from transmitter 100.

Transceiver 330 transmits and receives RF signals over antennas 340a-d. Transceiver 330 may represent any suitable form of RF transceiver. Although the example embodiment in FIG. 3 includes a certain number of antennas 340, alternative embodiments of transmitter 100 may include any appropriate number of antennas 340. Additionally, in particular embodiments, transceiver 330 may represent, in whole or in part, a portion of processor 310.

Figure 4:
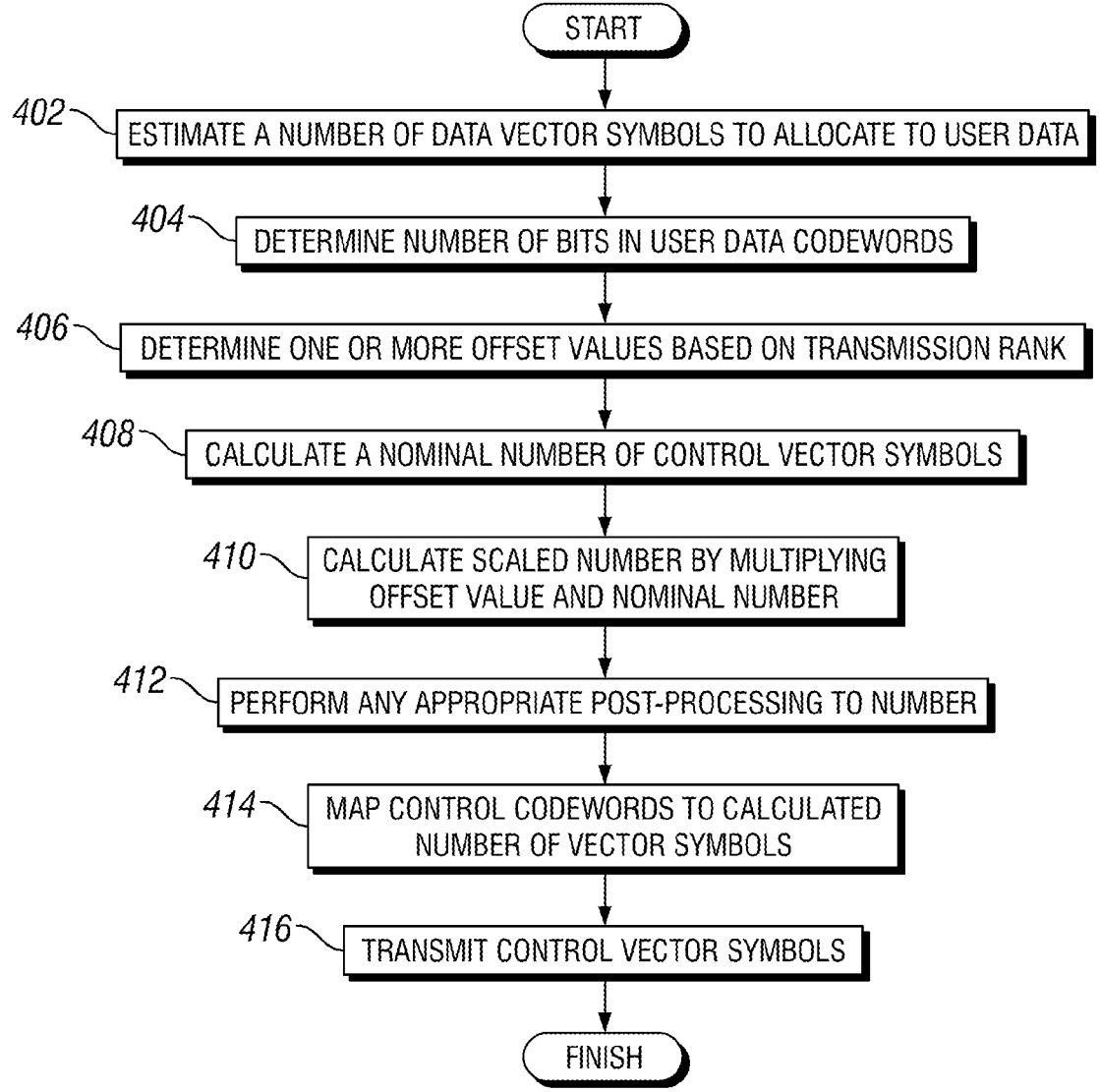
FIG. 4 is a flowchart detailing example operation of a particular embodiment of the transmitter.

FIG. 4 is a flowchart detailing example operation of a particular embodiment of transmitter 100. In particular, FIG. 4 illustrates operation of an embodiment of transmitter 100 in allocating transmission resources to the transmission of control codewords 120. The steps illustrated in FIG. 4 may be combined, modified, or deleted where appropriate. Additional steps may also be added to the example operation. Furthermore, the described steps may be performed in any suitable order.

In particular embodiments, operation may begin at step 402 with transmitter 100 estimating a number of vector symbols to be allocated to user data. As noted above, transmitter 100 may estimate the number of user data vector symbols in any appropriate manner. As one example, transmitter 100 may estimate the number of user data vector symbols by assuming pessimistically that all transmission resources allocated to transmitter 100 for the relevant subframe will be used to transmit user data. Thus, in such embodiments, transmitter 100 may estimate the number of vector symbols to be allocated to user data codewords ($\hat{Q}_{data}$) based on a value ($Q_{all}$) reflecting the total amount of transmission resources allocated to transmitter 100. The size and units of $Q_{all}$ depends on the manner in which the access network allocates transmission resources to transmitter 100. For instance, transmitter 100 may use a value of $Q_{all}=N \times M$, where N is the total number of vector symbols available to transmitter 100 for transmitting control information and user data in the relevant subframe (e.g., $N_{symb}^{PUSCH\text{-}initial}$ in certain LTE embodiments), and M is a total number of subcarriers available to transmitter 100 during the relevant subframe (e.g., $M_{sc}^{PUSCH\text{-}initial}$). Thus, as part of step 402, transmitter 100 may multiply a total number of subcarriers allocated for use by transmitter 100 in the relevant subframe by a total number of vector symbols 124 allocated to transmitter 100 to determine the total capacity allocated to transmitter 100 for the relevant subframe.

As another example, transmitter 100 may account for the use of transmission resources to transmit control codewords 120 when estimating the number of user data vector symbols. Thus, in such embodiments, transmitter 100 may estimate a number of vector symbols ($\hat{Q}_{data}$) to be allocated to user data that is dependent on the number of control vector symbols (Q') that would result from this allocation of vector symbols 124 to user data—that is, ($\hat{Q}_{data}=\hat{Q}_{data}(Q')$). In such embodiments, transmitter 100 may solve for $\hat{Q}_{data}$ and/or Q' recursively or solve for Q' directly using a closed-form expression for the relationship between $\hat{Q}_{data}$ and Q', such as $\hat{Q}=Q_{all}-\alpha \cdot Q'$ (where $\alpha$ is a predetermined constant or a configurable parameter).

At step 404, transmitter 100 determines a number of bits in one or more user data codewords 122 to be transmitted. In particular embodiments, user data codewords 122 may include CRC bits, and transmitter 100 may consider these CRC bits when counting the bits in the relevant user data codewords 122. Additionally, in particular embodiments, the plurality of user data codewords 124 counted by transmitter 100 may represent all of the user data codewords 122 to be transmitted during the subframe. In alternative embodiments, however, this plurality of user data codewords 122 represent only a subset of the total number of user data codewords 122 to be transmitted during the subframe. For example, in certain embodiments, transmitter 100 may determine the number of bits in step 404 based only on the user data codewords 122 to be transmitted on certain transmission layers. Thus, in such embodiments, transmitter 100 may, as part of step 404, identify the transmission layers over which transmitter 100 will transmit control codewords 120 during the subframe and then determine the total number of bits in only those user data codewords 122 that are to be transmitted over the identified transmission layers.

At some point during operation, transmitter 100 determines one or multiple offset values based on the transmission rank of the transmission to be made. As discussed above, the offset value(s) may depend in any suitable manner on the transmission rank. For example, in particular embodiments, transmitter 100 may select an offset value for transmission ranks associated with single-codeword transmissions that is larger than the offset value(s) transmitter 100 may select for transmission ranks associated with multiple-codeword transmissions. Additionally, in certain embodiments, the offset value(s) decrease with increasing transmission rank to account for the greater impact of mismatched precoders on lower transmission ranks. This may result in transmitter 100 using more overhead to transmit control information with low-rank transmissions in an effort to improve the robustness of such transmissions.

Furthermore, in certain embodiments, transmitter 100 may use only a single offset value in performing the allocation, and thus, may only need to determine a single offset value. As explained further below, however, transmitter 100 may alternatively use a first offset value for scaling the nominal number and a second offset value to determine the nominal number. Thus, in the illustrated example, transmitter 100 determines one or more offset values at step 406.

Transmitter 100 calculates a nominal number of control vector symbols based, at least in part, on the estimated number of user data vector symbols and the determined number of bits in the user data codewords 122. In particular embodiments, transmitter 100 may account for the fact that the nominal value will be scaled by an offset value ($\beta_{offset}$) when calculating the nominal value. As a result, the nominal number of control vector symbols calculated by transmitter 100 may also depend on an offset value. In some embodiments, this offset value is the same as the offset value transmitter 100 uses to scale the nominal value (i.e., $\beta_{offset}$). For example, in such embodiments, transmitter 100 may calculate the nominal number of control vector symbols u value $\hat{Q}'$ where:

$$\hat{Q}' = \frac{O \times \hat{Q}_{data}}{g(\cdot) + O \times \beta_{offset}},$$

where O is the number of bits of control data codewords 122 to be transmitted, $g(\cdot)$ is a function of the number of bits of user data codewords 122 to be transmitted, and $\hat{Q}_{data}$ is the estimate of the transmission resources allocated to user data for the relevant transmission.

Instead of using the same offset value to calculate the nominal number, transmitter 100 may use a second offset value ($\tilde{\beta}_{offset}$) to calculate the nominal number such that $Q'=\hat{Q}'(\tilde{\beta}_{offset}(r)) \cdot \beta_{offset}(r)$. For example, in such embodiments, transmitter 100 may calculate the nominal number of control vector symbols based on the value $\hat{Q}'$ where:

$$\hat{Q}' = \frac{O \times \hat{Q}_{data}}{g(\cdot) + O \times \tilde{\beta}_{offset}},$$

Thus, the illustrated embodiment of transmitter 100 calculates a nominal number of control vector symbols based, at least in part, on the estimated number of data vector symbols, the determined number of bits in the user data codewords, and an offset value (i.e., the first offset value or a second offset value) at step 408.

At step 410, transmitter 100 calculates a scaled number of control vector symbols by multiplying the nominal number of control vector symbols by a rank-specific offset value ($\beta_{offset}$). As noted above, if an offset value is used to calculate the nominal number of control vector symbols, the rank-specific offset value used in step 410 may represent the same or a different offset value.

In particular embodiments, transmitter 100 uses this scaled number of control vector symbols as the final number of control vector symbols. Alternatively, transmitter 100 may process the scaled value to provide a final number of a certain type (e.g., an integer value), ensure a final number within a particular range, or achieve some other goal with respect to the resulting number of control vector symbols. Thus, in particular embodiments, transmitter 100 may round or truncate the scaled number (e.g., by applying a ceiling or floor operation to the scaled number), adjust the scaled number based on a designated minimum or maximum value, or perform any other appropriate processing to the scaled number to generate a final number of control vector symbols, as shown at step 412.

After determining the final number of vector symbols 124 to allocate to control signaling, transmitter 100 then maps control codewords 120 available for transmission to the calculated number of vector symbols 124 at step 414. Transmitter 100 may perform any appropriate processing of the control vector symbols 124 to permit transmission of the control vector symbols 124 to a receiver in communication with transmitter 100 including, for example, the processing described above with respect to FIG. 2. After completing any appropriate processing of vector symbols 124, transmitter 100 then transmits control vector symbols 124 over a plurality of transmission layers using the plurality of antennas 114 at step 416. Operation of transmitter 100 with respect to transmitting these particular control codewords 120 may then end as shown in FIG. 4.

FIG. 5 is a structural block diagram showing the contents of a network node 500 that may serve as a receiver for control codewords 120 transmitted by transmitter 100 and/or that may serve as a scheduler for scheduling transmission of control codewords 120 by transmitter 100. As noted above, the described resource allocation techniques may also be utilized by devices in decoding transmissions received from transmitter 100 or in determining the appropriate amount of transmission resources to schedule for use by transmitter 100 in a given subframe. For example, in particular embodiments, transmitter 100 may represent a wireless terminal (such as an LTE UE) and network node 500 may represent an element of a radio access network that receives uplink transmission from the wireless terminal or that is responsible for scheduling the wireless terminal's use of transmission resources (such as an LTE eNodeB).

As shown in FIG. 5, the illustrated embodiment of network node 500 includes a processor 510, a memory 520, a transceiver 530, and a plurality of antennas 540a-d. Processor 510, memory 520, transceiver 530, and antennas 540 may represent identical or analogous elements to the similarly-named elements of FIG. 3. In particular embodiments of network node 500, some or all of the functionality of network node 500 described below with respect to FIGS. 6 and 7 may be implemented by processor 510 executing instructions and/or operating in accordance with its hardwired logic.

FIG. 6 is a flowchart detailing example operation of a particular embodiment of network node 500. In particular, FIG. 6 illustrates operation of an embodiment of network node 500 in receiving and decoding control codewords 120 received from transmitter 100. The steps illustrated in FIG. 6 may be combined, modified, or deleted where appropriate. Additional steps may also be added to the example operation. Furthermore, the described steps may be performed in any suitable order.

Operation of network node 500 begins at step 602 with network node 500 receiving a plurality of vector symbols 124 from transmitter 100. For purposes of decoding the vector symbols 124, network node 500 may need to determine the manner in which transmitter 100 allocated these vector symbols 124 between control signaling and user data. As a result, network node 500 may determine the number of the received vector symbols 124 that transmitter 100 used to transmit control codewords 120.

To properly decode the received vector symbols 124, network node 500 may need to follow the same or an analogous procedure to what transmitter 100 used to determine the resource allocation on the transmitting side. Thus, depending on the configuration of the relevant transmitter 100, network node 500 may be configured to determine the number of vector symbols 124 allocated to control codewords 120 (referred to herein as "control vector symbols") using any of the techniques described above. An example of this process for the example embodiment is shown at steps 604-614 of FIG. 6. In particular, FIG. 6 describes operation of an embodiment of network node 500 that communicates with the transmitter 100 described by FIGS. 1-3. Thus, network node 500 performs steps 604-614 in a similar or analogous fashion to that described above for the similarly-captioned steps in FIG. 4.

After network node 500 has determined the final number of vector symbols 124 that transmitter 100 allocated to control codewords 120, network node 500 decodes the received vector symbols 124 based on this number at step 616. For example, network node 500 may use this information to determine which of the received vector symbols 124 are carrying control codewords 120 and which are carrying user data codewords 122. If transmitter 100 has encoded control signaling and user data using different encoding schemes, network node 500 may then apply a different decoding scheme to the two types of vector symbols 124. Operation of network node 500 with respect to decoding the received symbol vectors may then terminate as shown in FIG. 6.

FIG. 7 is a flowchart detailing example operation of a particular embodiment of network node 500 responsible for scheduling the use of transmission resources by transmitter 100. The steps illustrated in FIG. 7 may be combined, modified, or deleted where appropriate. Additional steps may also be added to the example operation. Furthermore, the described steps may be performed in any suitable order.

In FIG. 7, operation of network node 500 begins at step 702 with network node 500 receiving a request for transmission resources from transmitter 100. This request may represent any appropriate information indicating network node 500 has information, including one or both of control signaling and user data, to transmit in a geographic area served by network node 500. In particular embodiments, network node 500 may represent an LTE eNodeB and this request may represent a scheduling request transmitted by transmitter 100 on PUCCH. Additionally, network node 500 may possess information regarding transmissions transmitter 100 is expected to make during the relevant subframe. For example, in the relevant subframe, transmitter may expect a HARQ ACK/NACK transmission from transmitter 100 responding to a previous transmission from network node 500. Alternatively or additionally, in particular embodiments, the scheduling request received by network node 500 may indicate the amount and/or type of information transmitter 100 is intending to transmit.

In response to receiving the request, network node 500 may determine an allocation of transmission resources to grant to transmitter 100 for use in transmitting the requested transmission. To determine this allocation, network node 500 may determine the amount of control information and user data network node 500 expects transmitter 100 to transmit in conjunction with the request. Network node 500 may determine these amounts based on information included in the request itself, information maintained locally by network node 500 itself (e.g., information on expected control information transmissions), and/or information received from any other suitable source.

Furthermore, in particular embodiments, network node 500 determines this overall allocation based on the assumption that transmitter 100 will determine an allocation for control vector symbols for the requested transmission based on the techniques described above. Thus, network node 500 may also use the techniques above to grant an appropriate amount of transmission resources to transmitter 100 for the requested transmission. Because the above techniques may involve transmitter 100 determining an allocation of control vector symbols that depends in part on the allocation of user data vector symbols, network node 500 may likewise estimate the control allocation based on an estimate allocation for use data. This may result in network node 500 determining a total allocation for transmitter 100 comprised of a user data allocation and a control information allocation, which itself depends on the user data allocation. Thus, in particular embodiments, network node 500 may determine the total allocation recursively. An example of this is shown by step 704 of FIG. 7.

At step 704, network node determines a transmission rank, a total number of vector symbols to be used by transmitter 100 for the requested transmission, and a number of bits of user data to be carried by each of a plurality of data codewords to be transmitted as part of the requested transmission. In particular embodiments, the determination of the transmission rank, the total number of vector symbols, and the number of bits carried by each data codeword accounts for an estimated number of control vector symbols that will result from this determination. Thus, as part of step 704, network node 500 may determine the estimated number of control vector symbols by estimating the number of user data vector symbols to be used in transmitting the user data codewords, estimating the number of bits in the control codewords 120 to be transmitted, determining one or more rank-specific offset values for the transmission, and calculating the number of control vector symbols based on the estimated number of user data vector symbols, the estimated number of bits in the control codewords 120, the number of bits of user data to be carried by each of the user data codewords, and the offset value(s).

Depending on the configuration of transmitter 100, network node 500 may process the estimated number of control vector symbols in an appropriate manner as described above before using the value to make the determination of step 704. For example, network node 500 may calculate a nominal number of control vector symbols based on the estimated number of data vector symbols, the estimated number of bits in the control codewords 120, and the number of bits of user data to be carried by each of the user data codewords. Network node 500 may then scale this nominal number by an offset, increase the nominal number to meet a minimum number, apply a ceiling operation to the nominal, and/or perform any other appropriate processing of the nominal number to calculate the final estimated number of control vector symbols.

Network node 500 then uses this determination in responding to the request sent by transmitter 100. In particular embodiments, if network node 500 decides to grant the request, network node 500 may communicate aspects of the determined allocation to transmitter 100. Therefore, in particular embodiments, network node 500 may respond to the request by generating a particular response (e.g., a scheduling grant) to the request based on the determined allocation and transmitting the response to transmitter 100, as shown by steps 706-708 of FIG. 7. For example, in certain LTE embodiments, network node 500 may generate a scheduling grant that includes information indicating the determined transmission rank, the determined total number of vector symbols, and the number of bits to be used for each data codeword and send this scheduling grant to transmitter 100. Alternatively or additionally, network node 500 may use the determined allocation in deciding whether to grant the request or in deciding how to prioritize the request. Operation of network node 500 with respect to scheduling transmitter 100 for this subframe may then terminate as shown in FIG. 7.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method in a wireless terminal for wirelessly transmitting data using a plurality of transmission layers, comprising:
    estimating a number of user data vector symbols to be allocated to user data during a subframe;
    determining a number of user data bits in the one or more user data codewords;
    determining an offset value based, at least in part, on a number of user data codewords the wireless terminal will be transmitting during the subframe;
    calculating a number of control vector symbols to allocate to control information based, at least in part, on the number of user data vector symbols, the number of user data bits, and the offset value;
    mapping one or more control codewords to at least the calculated number of control vector symbols, wherein the control codewords comprise encoded control information; and
    transmitting, from the wireless terminal, vector symbols carrying the user data codewords and the control codewords over a plurality of transmission layers according to the mapping.

2. The method of claim 1, wherein calculating the number of control vector symbols comprises calculating the number of control vector symbols, such that the number of control vector symbols is proportional to the offset value.

3. The method of claim 1, wherein calculating the number of control vector symbols comprises calculating the number of control vector symbols, such that the calculated number of control vector symbols increases with increases in the offset value.

4. The method of claim 1, wherein calculating the number of control vector symbols comprises calculating the number of control vector symbols, such that the number of control vector symbols is a multiple of the offset value.

5. The method of claim 1, wherein mapping the control codewords to at least the calculated number of control vector symbols comprises:
    converting the calculated number of control vector symbols to an integer value; and
    mapping the control codewords to a number of control vector symbols equal to the integer value.

6. The method of claim 5, wherein converting the calculated number of control vector symbols to an integer value comprises applying a ceiling function to the calculated number of control vector symbols.

7. The method of claim 5, wherein converting the calculated number of control vector symbols to an integer value comprises adjusting the calculated number of control vector symbols so that the calculated number of control vector symbols falls within a specified range.

8. The method of claim 7, wherein adjusting the calculated number comprises adjusting the calculated number based on at least one of a maximum value and a minimum value.

9. The method of claim 1, wherein determining an offset value based, at least in part, on the number of user data codewords the wireless terminal will be transmitting during the subframe comprises:
    using a first offset value if the wireless terminal will be transmitting a single user data codeword during the subframe; and
    using a second offset value if the wireless terminal will be transmitting multiple user data codewords during the subframe.

10. The method of claim 1, wherein estimating the number of user data vector symbols to be allocated to data codewords during the subframe comprises estimating the number of user data vector symbols based at least in part on a total number of subcarriers scheduled for use by the wireless terminal, $M_{sc}^{PUSCH\text{-}initial}$, and a total number of vector symbols granted to the wireless terminal, $N_{symb}^{PUSCH\text{-}initial}$.

11. The method of claim 10, wherein estimating the number of user data vector symbols comprises calculating a value $\hat{Q}_{data}$ such that $\hat{Q}_{data} = M_{sc}^{PUSCH\text{-}initial} N_{symb}^{PUSCH\text{-}initial}$.

12. The method of claim 1, further comprising determining a number of bits as a sum, over a plurality of user data codewords, of the number of bits in each user data codeword to be transmitted during a subframe.

13. The method of claim 1, wherein the number of user data codeword symbols includes a minimum number of user data codeword symbols.

14. The method of claim 1, wherein determining a number of bits in a plurality of user data codewords to be transmitted during the subframe comprises:
    determining a first number of bits in a first user data codeword and a second number of bits in a second user data codeword to be transmitted during the subframe.

15. The method of claim 14, wherein calculating a number of control vector symbols to allocate to control information based, at least in part, on the number of user data vector symbols, the number of user data bits, and the offset value comprises:
    calculating a number of control vector symbols to allocate to control information based, at least in part, on the number of user data vector symbols, the first and second number of user data bits, and the offset value.

* * * * *

UNITED STATES PATENT AND TRADEMARK OFFICE
CERTIFICATE OF CORRECTION

PATENT NO.        : 9,591,627 B2
APPLICATION NO.   : 14/721499
DATED             : March 7, 2017
INVENTOR(S)       : Hammarwall et al.

Page 1 of 2

It is certified that error appears in the above-identified patent and that said Letters Patent is hereby corrected as shown below:

On the Title Page

In Item (56), under "OTHER PUBLICATIONS", in Column 2, Line 4, delete "(Mar." and insert -- (Apr. --, therefor.

In the Specification

In Column 1, Line 9, delete "2013," and insert -- 2013, now Pat. No. 9,042,232, --, therefor.

In Column 10, Lines 16-22, in Equation 5, delete "$\hat{Q}' = O \cdot f \left( \hat{Q}_{data}(Q'), \sum_{r=0}^{C_{0,0}-1} K_{0,r}, \ldots, \sum_{r=0}^{C_{0,N_{CW}}-1} K_{N_{CW}-1,r} \right) \cdot \beta_{offset}(r)$" and insert -- $Q' = O \cdot f(\hat{Q}_{data}(Q'), \sum_{r=0}^{C_{0,0}-1} K_{0,r}, \ldots, \sum_{r=0}^{C_{0,N_{CW}}-1} K_{N_{CW}-1,r}) \cdot \beta_{offset}(r)$ --, therefor.

In Column 11, Line 43, delete "symbol vectors" and insert -- vector symbols --, therefor.

In Column 11, Line 53, delete "transmission As" and insert -- transmission. As --, therefor.

In Column 13, Line 22, delete "transmitter 320" and insert -- transmitter 100 --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*

In Column 14, Line 27, delete "user data codewords 124" and insert -- user data codewords 122 --, therefor.

In Column 15, Lines 11-12, delete "u value" and insert -- value --, therefor.